United States Patent Office 3,317,541
Patented May 2, 1967

3,317,541
DECAHYDROISOQUINOLINE ESTERS OF SUBSTITUTED BENZOIC ACID AND METHODS FOR THEIR PREPARATION
Sumio Umezawa and Tatsuo Tomioka, Tokyo, Toshio Nakamura, Ohmiya, Saitama, and Yasuo Hoshiide, Kitaadachi-gun, Saitama, Japan, assignors to Nikken Chemicals Co., Ltd., Tokyo, Japan, a corporation of Japan
No Drawing. Filed Dec. 6, 1963, Ser. No. 328,491
Claims priority, application Japan, Dec. 7, 1962, 37/54,812
5 Claims. (Cl. 260—287)

The present invention relates to decahydroisoquinoline esters of substituted benzoic acid and methods for their preparation, and more particularly to 7-methoxybenzoyloxy-2-alkyldecahydroisoquinolines and quaternary ammonium salts thereof and to methods for their preparation. The esters of the present invention are comprehended by the general formula:

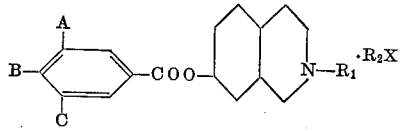

wherein A, B, and C represent respectively a hydrogen atom or a methoxy radical, a case where A, B, and C are all hydrogen atoms is excluded, and $R_1$ and $R_2$ represent respectively lower alkyl radical having one, two, three, or four carbon atoms, and X represents a halogen atom.

One of the objects of the present invention is to produce a new class of valuable chemical compounds useful as hypotensive agents.

Another object of the present invention is to provide a synthetic method of a new class of chemical compounds of the following general formula:

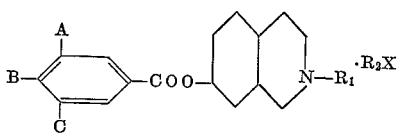

wherein A, B, C, $R_1$, $R_2$, and X are each as hereinbefore defined.

Other objects, features and advantages of the present invention will become apparent from the following description.

The each compound of the present invention which has not been reported may be used medically in the form of a water-soluble quaternary ammonium salt. These compounds have significant lowering action of blood pressure and are therapeutically valuable hypotensive agents.

In the practice of the present invention, an aracyl halide comprehended by the general formula:

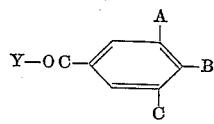

wherein A, B, and C are each as hereinbefore defined, and Y represents a halogen atom, is reacted with an alcohol comprehended by the general formula:

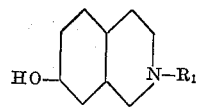

wherein $R_1$ is as hereinbefore defined, to produce the desired ester.

The reactions are carried out by heating 7-hydroxy-2-alkyldecahydroisoquinolines which are prepared by hydrogenation of 7-hydroxy-2-alkyl-1,2,3,4-tetrahydroisoquinolines and methoxy benzoyl halides in an inert organic solvent such as benzene.

At the end of reactions each of desired esters is in the form of a salt of hydrohalogenic acid. For purification, each of their salts is treated with water to remove insoluble parts which are corresponding to anhydrides of methoxybenzoic acid. In order to obtain the free bases of the desired esters, the substances derived from water layers are basified and chromatographed. Furthermore, in order to convert the free base to the quaternary ammonium salts, each of the resulting free bases of the desired esters is reacted with halogen alkyl in the inert organic solvent such as ether. Resulting quaternary ammonium salts are in the state of mixtures of some stereoisomers. Generally, these mixtures of stereoisomers may be separable to one or more stereoisomers in the crystalline forms from the suitable solvents such as acetone.

The invention is further described in the following examples which are illustrative and not limitative thereof.

EXAMPLE 1

Instance of 7-anisoyloxy-2-methyldecahydroisoquinoline

A solution of 1.29 grms. of anisoylchloride and 1.28 grms. of 7-hydroxy-2-methyldecahydroisoquinoline in dry benzene was heated and then distilled benzene to give a viscous residue. This residue was triturated with water, and the aqueous layer was separated from the insoluble part (anisoylanhydride) by filtration and evaporated. The viscous residue was then dissolved in a mixture of acetone and methanol, and vigorously stirred with an excess of silver carbonate. After removal of the precipitate by filtration, the solution was evaporated to give an oily product. This product was chromatographed on alumina and then developed and eluted with ether to give two fractions. The first fraction was evaporated to give an oily product of 7-anisoyloxy-2-methyldecahydroisoquinoline (0.75 grm.) (yield 32.8%).

In order to convert 7-anisoyloxy-2-methyldecahydroisoquinoline to the corresponding methyl bromide derivative, 0.75 grm. of 7-anisoyloxy-2-methyldecahydroisoquinoline and an excess of methyl bromide were reacted in ether. Removal of the solvent from the reaction mixture gave 0.97 grm. (yield 98.5%) of crude crystals of quaternary ammonium salt which was a mixture of stereoisomeres.

In order to separate the stereoisomers, this crude product was thoroughly triturated with 110 ml. of acetone, and the acetone-layer was separated from the insoluble part by filtration. The insoluble part which was a stereoisomer of methyl bromide derivative of the desired ester weighed 0.32 grm. (yield 33.0%). Repeated recrystallizations from ethanol-petroleum ether gave colorless needles with a M.P. of 281 to 282° C.

Analysis.—$C_{19}H_{28}O_3NBr$, calculated: C, 57.29; H, 7.08; N, 3.52. Found: C, 57.60; H, 7.32; N, 3.67.

The above-mentioned acetone-layer was evaporated, and the residue was again dissolved in 60 ml. of acetone, leaving a small insoluble part. The acetone solution was concentrated to 20 ml., and the separated crystals which were another isomer of methyl bromide derivative of the desired ester were collected; 0.25 grm. (yield 25.8%). Recrystallizations from acetone-ethyl acetate gave colorless needles with a M.P. of 220 to 223° C.

Analysis.—$C_{19}H_{28}O_3NBr$, calculated: C, 57.29; H, 7.08; N, 3.52. Found: C, 57.63; H, 7.28; N, 3.79.

EXAMPLE 2

Instance of 7-veratroyloxy-2-methyldecahydroisoquinoline

7 - veratroyloxy - 2 - methyldecahydroisoquinoline was prepared in 36.2% yield as an oily product in the same manner as that described in Example 1, except that veratroyl chloride was used instead of anisoyl chloride.

The corresponding methyl bromide derivative which was a mixture of stereoisomers was prepared from 7-veratroyloxy2-methyldecahydroisoquinoline and methyl bromide in 97.1% yield in the same manner as that described in Example 1.

In order to separate the stereoisomers in a manner similar to that of Example 1, fractionation of the product with acetone was undertaken to give two fractions. The more insoluble fraction which was a stereoisomer of methyl bromide derivative of the desired ester was obtained in 22.9% yield. Repeated recrystallizations from ethanol-petroleum ether gave colorless needles with a M.P. of 263 to 264° C.

*Analysis.*—$C_{20}H_{30}O_4NBr$, calculated: C, 56.08; H, 7.06; N, 3.27. Found: C, 56.08; H, 7.03; N, 3.32.

The more soluble fraction which was another isomer of methyl bromide derivative of the desired ester was obtained in 44.2% yield. Recrystallizations from acetone gave colorless needles with a M.P. of 169 to 170° C.

*Analysis.*—$C_{20}H_{30}O_4NBr\cdot\frac{1}{2}H_2O$, calculated: C, 54.93; H, 7.14; N, 3.20. Found: C, 55.14; H, 6.93; N, 2.93.

EXAMPLE 3

*Instance of 7-(tri-o-methylgalloyloxy)-2-methyl decahydroisoquinoline*

7 - (tri - o - methylgalloyloxy) - 2 - methyldecahydroisoquinoline was prepared in 32.2% yield as an oily product in the same manner as that described in Example 1, except that tri-o-methylgalloyl chloride was used instead of anisoyl-chloride.

The corresponding methyl bromide derivative which was a mixture of stereoisomers was prepared from 7-(tri - o - methylgalloyloxy) - 2 - methyldecahydroisoquinoline and methyl bromide in 98.3% yield in the same manner as that described in Example 1.

In order to separate the stereoisomers in a manner similar to that of Example 1, fractionation of the product with acetone was undertaken to give two fractions. The more insoluble fraction which was a stereoisomer of methyl bromide derivative of the desired ester was obtained in 22.5% yield. Repeated recrystallization from ethanol-petroleum ether gave colorless needles with a M.P. of 262.5 to 264.0° C.

*Analysis.*—$C_{21}H_{32}O_5NBr$, calculated C, 55.02 H, 7.04; N, 3.06. Found: C, 54.58; H, 7.37; N, 3.36.

The more soluble fraction which was another isomer of methyl bromide derivative of the desired ester was obtained in 36.4% yield. Recrystallizations from acetone gave colorless plates with a M.P. of 201.5 to 203.5° C.

*Analysis.*—$C_{21}H_{32}O_5NBr$, calculated: C, 55.02; H, 7.04; N, 3.06. Found: C, 55.01; H, 7.04; N, 3.27.

EXAMPLE 4

*Instance of 7-anisoyloxy-2-ethyldecahydroisoquinoline*

7-anisoyloxy-2-ethyldecahydroisoquinoline was prepared in 32.9% yield as an oily product in the same manner as that described in Example 1, except that 7-hydroxy-2-ethyldecahydroisoquinoline was used instead of 7-hydroxy-2-methyldecahydroisoquinoline.

The corresponding methyl bromide derivative was prepared from 7-anisoyloxy-2-ethyldecahydroisoquinoline and methyl bromide in 98.5% yield in the same manner as that of Example 1.

The fractionation of the product with acetone in a manner similar to that of Example 1 gave two fractions in the crystalline form. The more insoluble fraction was obtained in 6.2% yield. Repeated recrystallization from ethanol-petroleum ether gave colorless crystals with a M.P. of 243.5 to 245.0° C.

*Analysis.*—$C_{20}H_{30}O_3NBr$, calculated: C, 58.25; H, 7.33; N, 3.40. Found: C, 58.43; H, 7.41; N, 3.37.

The more soluble fraction was obtained in 29.9% yield. Recrystallizations from acetone gave colorless crystals with a M.P. 234.0 to 237.5° C.

*Analysis.*—$C_{20}H_{30}O_3NBr$, calculated: C, 58.25; H, 7.33; N, 3.40. Found: C, 58.33; H, 7.42; N, 3.25.

The purity of above-mentioned two crystals as a stereoisomer was not investigated.

EXAMPLE 5

*Instance of 7-(tri-o-methylgalloyloxy)-2-ethyldecahydroisoquinoline*

7 - (tri-o-methylgalloyloxy)-2-ethyldecahydroisoquinoline was prepared in 20.0% yield as an oily product in the same manner as that described in Example 1, except that 7-hydroxy-2-ethyldecahydroisoquinoline and tri-o-methylgalloyl chloride were used instead of 7-hydroxy-2-methyldecahydroisoquinoline and anisoyl chloride.

The corresponding methyl bromide derivative was prepared from 7-(tri-o-methylgalloyloxy)-2-ethyldecahydroisoquinoline and methyl bromide in 97.5% yield in the same manner as that of Example 1.

The treatment of the product with a small volume of acetone gave insoluble crystals in 14.3% yield. Recrystallization from ethanol-petroleum ether gave colorless needles with a M.P. of 244.5 to 245.0° C.

*Analysis.*—$C_{22}H_{34}O_5NBr$, calculated: C, 55.93; H, 7.25. Found: C, 55.89; H, 7.37.

7-anisoyloxy - 2 - propyldecahydroisoquinoline and its quaternary ammonium salt could be prepared from anisoyl chloride and 7-hydroxy-2-propyldecahydroisoquinoline in a manner similar to that of Example 1.

7-anisoyloxy-2-butyldecahydroisoquinoline and its quaternary ammonium salt could be prepared from anisoyl chloride and 7-hydroxy-2-butyldecahydroisoquinoline in a manner similar to that of Example 1.

What is claimed is:

1. A compound of the formula

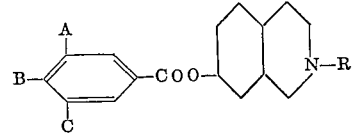

wherein one of A, B and C is methoxy and each of the others is selected from the group consisting of hydrogen and methoxy and R is lower alkyl of 1 to 4 carbon atoms.

2. Methyl halogenide of a compound as claimed in claim 1.

3. Ethyl halogenide of a compound as claimed in claim 1.

4. Propyl halogenide of a compound as claimed in claim 1.

5. Butyl halogenide of a compound as claimed in claim 1.

References Cited by the Examiner

UNITED STATES PATENTS 2,800,475  7/1957  Robinson _____ 260—286
3,100,175  8/1963  Bourquin et al. _____ 260—287
3,113,135  12/1963  Hodel _____ 260—289

OTHER REFERENCES

Cmpykoe et al.: Zur Obsihihei Khim, vol. 2a, pp. 3831–5 (1959), copy in 260/287.

ALEX MAZEL, *Primary Examiner.*

DONALD G. DAUS, *Assistant Examiner.*